(12) United States Patent
Yoshimura et al.

(10) Patent No.: US 9,151,290 B2
(45) Date of Patent: Oct. 6, 2015

(54) FUEL SUPPLY PUMP AND MANUFACTURING METHOD OF HOUSING OF THE SAME

(75) Inventors: Tetsuya Yoshimura, Toyota (JP); Katsumi Mori, Chiryu (JP); Kenichi Niinuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 994 days.

(21) Appl. No.: 13/297,353

(22) Filed: Nov. 16, 2011

(65) Prior Publication Data
US 2012/0152112 A1 Jun. 21, 2012

(30) Foreign Application Priority Data
Dec. 20, 2010 (JP) .................................. 2010-282634

(51) Int. Cl.
*F04B 53/16* (2006.01)
*B23P 9/00* (2006.01)
*F04B 1/04* (2006.01)

(52) U.S. Cl.
CPC ................ *F04B 53/162* (2013.01); *B23P 9/00* (2013.01); *F04B 1/0421* (2013.01); *Y10T 29/49236* (2015.01)

(58) Field of Classification Search
CPC ................ F04B 53/162; F04B 1/0421; Y10T 29/49236; B23P 9/00
USPC ........................................................ 92/169.1
See application file for complete search history.

(56) References Cited

U.S. PATENT DOCUMENTS

| 6,154,946 | A | * | 12/2000 | Kapp | .............................. | 29/447 |
| 2009/0191077 | A1 | * | 7/2009 | Yoshitake | ..................... | 417/559 |
| 2010/0154501 | A1 | | 6/2010 | Kampmann et al. | | |
| 2011/0209803 | A1 | | 9/2011 | Sugimoto et al. | | |

FOREIGN PATENT DOCUMENTS

| JP | P2008-111396 A | 5/2008 |
| JP | P2009-221910 A | 10/2009 |

OTHER PUBLICATIONS

Japanese Office Action (2 pages) dated Jan. 8, 2013, issued in corresponding Japanese Application No. 2010-282634 with English translation (3 pages).

* cited by examiner

*Primary Examiner* — Nathaniel Wiehe
*Assistant Examiner* — Abiy Teka
(74) *Attorney, Agent, or Firm* — Nixon & Vanderhye P.C.

(57) ABSTRACT

A cylinder body includes a cylinder hole and a discharge flow passage. The cylinder hole receives a plunger and forms a pressurizing chamber in one axial end portion thereof. The discharge flow passage is connected to the pressurizing chamber and is adapted to guide and discharge the pressurized fuel from the pressurizing chamber to an outside of the housing. A connection opening of the discharge flow passage is formed in a hole wall of the cylinder hole. A pressure is applied to a predetermined prestressing subject area in the hole wall of the cylinder hole and a passage wall of the discharge flow passage through autofrettage to generate a residual compression stress in the predetermined prestressing subject area and thereby to form a prestressed area of a final product. The prestressing subject area includes an inner peripheral edge of the connection opening.

16 Claims, 5 Drawing Sheets

- - - - - - HIGH HARDNESS SECTION
- - - - - - LOW HARDNESS SECTION
::::::  INJECTION AREA OF PRESSURE APPLYING MEDIUM

- - - - - HIGH HARDNESS SECTION
------- LOW HARDNESS SECTION
::::::: INJECTION AREA OF PRESSURE APPLYING MEDIUM

- - - - - HIGH HARDNESS SECTION
- - - - - LOW HARDNESS SECTION
:::::: INJECTION AREA OF PRESSURE APPLYING MEDIUM

FUEL SUPPLY PUMP AND MANUFACTURING METHOD OF HOUSING OF THE SAME

CROSS REFERENCE TO RELATED APPLICATION

This application is based on and incorporates herein by reference Japanese Patent Application No. 2010-282634 filed on Dec. 20, 2010.

BACKGROUND OF THE INVENTION

1. Field of the Invention

The present invention relates to a fuel supply pump and a manufacturing method of a housing of the fuel supply pump.

2. Description of Related Art

With reference to FIG. 5, a prior art fuel supply pump 100 includes a plunger 101, a cylinder body 103 and a plunger drive mechanism (not shown). The plunger 101 is adapted to reciprocate in an axial direction thereof. The cylinder body 103 includes a cylinder hole 102, which receives the plunger 101 in an axially slidable manner. The plunger drive mechanism (not shown) converts a rotational motion, which is transmitted from an internal combustion engine (not shown), into a linear motion and conducts the linear motion to the plunger 101. The fuel supply pump 100 is applied to an accumulator type fuel injection system, which injects high pressure fuel having a pressure of more than 100 MPa into the internal combustion engine through a common rail.

Furthermore, in the fuel supply pump 100, one axial end portion of the cylinder hole 102 is fluid-tightly closed (partitioned) by the plunger 101 to form a pressurizing chamber 104, in which fuel is pressurized. In the fuel supply pump 100, the plunger 101, which is axially slidably received in the cylinder hole 102, is axially reciprocated to change a volume of the pressurizing chamber 104, so that the fuel is drawn into the pressurizing chamber 104 and is then discharged from the pressurizing chamber 104 upon pressurization of the fuel in the pressurizing chamber 104.

Specifically, a discharge flow passage 106 is connected to the pressurizing chamber 104 to discharge the pressurized fuel from the pressurizing chamber 104, and a connection opening 107 of the discharge flow passage 106 is formed in a hole wall (an inner peripheral wall) of the cylinder hole 102, which forms the pressurizing chamber 104. Furthermore, a check valve 108 is placed in the discharge flow passage 106 to limit a backflow of the fuel toward the pressurizing chamber 104. When the pressure of the fuel in the pressurizing chamber 104 becomes larger than a predetermined valve opening pressure, the check valve 108 is opened, so that the fuel, which is pressurized in the pressurizing chamber 104, is guided to an outside of the fuel supply pump 100 through the discharge flow passage 106. In this way, the fuel, which is pressurized in the pressurizing chamber 104, is discharged to the outside of the fuel supply pump 100 through the discharge flow passage 106 and is then supplied to the common rail.

In the fuel supply pump 100, a stress load is repeatedly and intensively applied to an inner peripheral edge 109 of the connection opening 107 and an area adjacent to the inner peripheral edge 109 upon repeating of increasing and decreasing the fuel pressure in the pressurizing chamber 104. Therefore, it is required to increase the pressure resistance at the inner peripheral edge 109 of the connection opening 107 and the area adjacent to the inner peripheral edge 109.

It has been proposed to increase the pressure resistance by applying a residual compression stress through autofrettage. Specifically, It is known to apply the technique of autofrettage to a common rail or a fuel injector of an accumulator fuel injection system (see, for example, DE102006054440B3 corresponding to US2010/0154501A1).

Therefore, it may be conceivable to increase the pressure resistance at the inner peripheral edge 109 of the connection opening 107 and the area adjacent to the inner peripheral edge 109 by applying the technique of the autofrettage thereto.

However, the inner peripheral edge 109 is formed in a hole wall of the cylinder hole 102, which has been processed to have a high hardness through, for example, a carburizing process, a nitriding process or a hardening process (a quenching process) to meet a requirement of having a seizing resistance against the slide contact of the plunger 101 to the hole wall of the cylinder hole 102. Therefore, even when the pressure is applied to the hole wall of the cylinder hole 102 to increase the pressure resistance at the inner peripheral edge 109 and the area adjacent to the inner peripheral edge 109 through the autofrettage, it is difficult to apply the residual compression stress to the inner peripheral edge 109 and the area adjacent to the inner peripheral edge 109. Thereby, it is not possible to increase the pressure resistance at the inner peripheral edge 109 and the area adjacent to the inner peripheral edge 109.

SUMMARY OF THE INVENTION

The present invention addresses the above disadvantage.

According to the present invention, there is provided a fuel supply pump, which includes a plunger and a housing. The plunger is adapted to reciprocate in an axial direction thereof. The housing includes a cylinder hole, in which the plunger is axially slidably received. One axial end portion of the cylinder hole is fluid-tightly closed by the plunger to form a pressurizing chamber therein. The plunger is adapted to reciprocate and slide in the axial direction in the cylinder hole to change a volume of the pressurizing chamber and thereby to draw fuel into the pressurizing chamber and then discharge the fuel from the pressurizing chamber upon pressurization of the fuel in the pressurizing chamber. A discharge flow passage is connected to the pressurizing chamber at the housing and is adapted to guide and discharge the pressurized fuel from the pressurizing chamber to an outside of the fuel supply pump. A connection opening of the discharge flow passage opens to the pressurizing chamber and is formed in a hole wall of the cylinder hole, which forms the pressurizing chamber. A prestressed area is formed in the hole wall of the cylinder hole and a passage wall of the discharge flow passage such that the prestressed area includes an inner peripheral edge of the connection opening and has a residual compression stress generated by a pressure that is applied through autofrettage.

According to the present invention, there is also provided a manufacturing method for a housing of a fuel supply pump. The housing is formed from a metal material such that the housing includes a cylinder hole and a discharge flow passage. The cylinder hole is adapted to receive a plunger in an axially slidably manner and forms a pressurizing chamber in one axial end portion of the cylinder hole to pressurize fuel therein upon slide movement of the plunger in the cylinder hole. The discharge flow passage is connected to the pressurizing chamber and is adapted to guide and discharge the pressurized fuel from the pressurizing chamber to an outside of the housing. A connection opening of the discharge flow passage opens to the pressurizing chamber and is formed in a hole wall of the cylinder hole, which forms the pressurizing chamber. A pressure is applied to a predetermined prestressing subject area in the hole wall of the cylinder hole and a passage wall of the discharge flow passage through autofrettage to generate a residual compression stress in the predetermined prestressing subject area and thereby to form a prestressed area, wherein the predetermined prestressing subject area includes an inner peripheral edge of the connection opening.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

Figure 1:
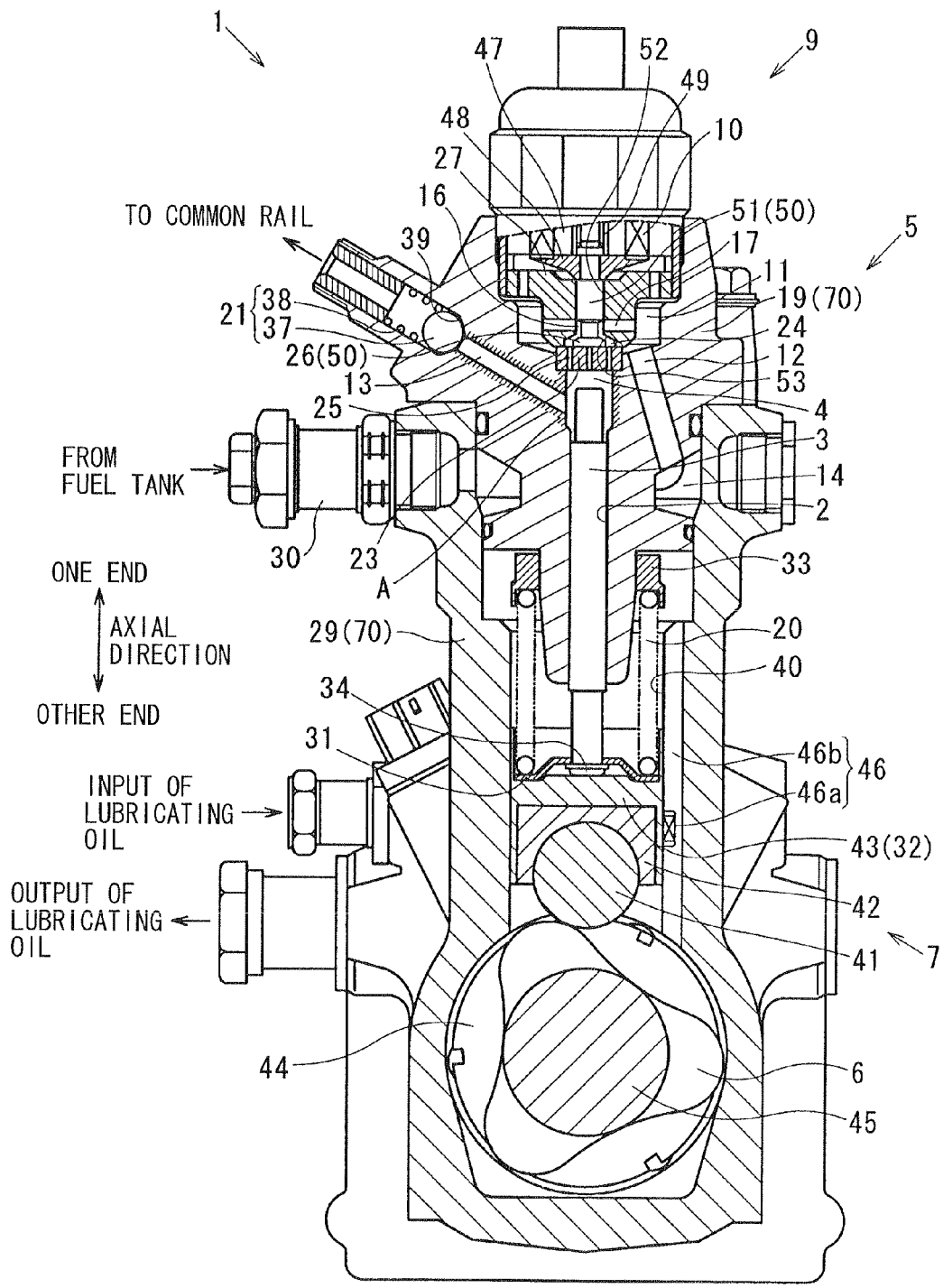
FIG. 1 is a schematic cross sectional view showing a fuel supply pump according to a first embodiment of the present invention.

A structure of a fuel supply pump 1 according to a first embodiment of the present invention will be described with reference to FIG. 1.

The fuel supply pump 1 pressurizes and discharges fuel to be supplied to an internal combustion engine (not shown) of a vehicle (e.g., an automobile). The fuel supply pump 1 forms a part of an accumulator type fuel injection system. In the accumulator type fuel injection system, fuel, which is accumulated in a common rail (an accumulator) under a high pressure, is injected into the engine. The fuel supply pump 1 pressurizes and discharges the fuel, which is drawn from a fuel tank, to supply the pressurized fuel to the common rail. The fuel injection system includes an undepicted electronic control unit (ECU), which controls an operation of each of corresponding devices, and the operation of the fuel supply pump 1 is also controlled by the ECU.

The fuel supply pump 1 includes a high pressure pump 5 and a plunger drive mechanism 7. In the high pressure pump 5, a plunger 3 is axially slidably supported in a cylinder hole 2 to pressurize fuel in a pressurizing chamber 4. In the plunger drive mechanism 7, a rotational motion, which is transmitted from the internal combustion engine, is converted into a linear reciprocating motion in response to rotation of a cam 6. In response to the reciprocating motion of the plunger 3, the fuel is drawn into and is pressurized in the pressurizing chamber 4 and is thereafter discharged from the pressurizing chamber 4, so that the fuel is supplied to the internal combustion engine. In the following discussion, unless otherwise defined, an axial direction refers to an axial direction of the plunger 3.

The fuel supply pump 1 includes a solenoid valve 9, which enables and disables input and output of the fuel relative to the pressurizing chamber 4. The ECU controls the operation of the fuel supply pump 1 by controlling energization of a solenoid coil 10 of the solenoid valve 9. A plurality of fuel flow passages 11-14, 16-17 is formed in the high pressure pump 5, and the solenoid valve 9 is installed to the high pressure pump 5 such that the solenoid valve 9 opens or closes a communication between the pressurizing chamber 4 and the fuel flow passages 11, 12, 14, 16, 17, which are located on an upstream side (fuel tank side) of the pressurizing chamber 4 among the fuel flow passages 11-14, 16-17.

The high pressure pump 5 includes the plunger 3, a cylinder body 19, a spring 20 and a check valve 21. The plunger 3 is driven toward one axial side (i.e., toward one end shown in FIG. 1) by the plunger drive mechanism 7. The cylinder body 19 includes the cylinder hole 2 and axially slidably supports the plunger 3 in the cylinder hole 2. The spring 20 urges the plunger 3 toward the other axial side (i.e., toward the other end shown in FIG. 1). The check valve 21 opens or closes a communication between the pressurizing chamber 4 and an outlet conduit (not shown), which is located at an outside of the fuel supply pump 1.

The plunger 3 is supported such that the other axial end portion of the plunger 3 projects from the cylinder hole 2, and the one axial end portion of the plunger 3 reciprocates in the cylinder hole 2. One axial end portion of the cylinder hole 2 is fluid-tightly closed (partitioned) by the plunger 3 to form the pressurizing chamber 4. A volume of the pressurizing chamber 4 is compressed or expanded in response to the reciprocation of the plunger 3.

One axial end of the cylinder body 19 is axially recessed to form a recessed portion such that an inner diameter of the recessed portion is reduced in a stepwise manner toward the other axial end of the cylinder body 19. One end of the cylinder hole 2 (i.e., one end of the pressurizing chamber 4) opens in a bottom surface of the recessed portion, which is closest to the other axial end of the cylinder body 19 in the recessed portion. Furthermore, a flow passage forming member 23 is placed at the bottom of the recessed portion to close the opening of the pressurizing chamber 4 located at the one axial side. The flow passage forming member 23 includes a communication passage 25, which communicates between a valve chamber 24 of the solenoid valve 9 and the pressurizing chamber 4. The flow passage forming member 23 serves as a valve seat, against which a valve portion 26 of the solenoid valve 9 is seatable, and also serves as a stopper, which limits movement of the valve portion 26 toward the other axial side.

A valve body 27 of the solenoid valve 9 is received on the one end side of the flow passage forming member 23 in the axial direction in such a manner that the valve body 27 contacts the flow passage forming member 23. An annular fuel flow passage 11 is formed between the cylinder body 19 and the valve body 27. A female thread is formed in an inner peripheral surface of the cylinder body 19 on the one end side of the fuel flow passage 11 to threadably engage with a male thread of the solenoid valve 9 (more specifically, a male thread of a housing of the solenoid valve 9). Thereby, the solenoid valve 9 is threadably fixed to the cylinder body 19 through the engagement between the female thread of the cylinder body 19 and the male thread of the solenoid valve 9.

Furthermore, a fuel flow passage 12 and a fuel flow passage 13 are formed in the cylinder body 19. The fuel flow passage 12 is communicated with the annular fuel flow passage 11. The fuel flow passage 13 serves as a discharge flow passage, through which the fuel pressurized in the pressurizing chamber 4 is discharged out of the fuel supply pump 1. Furthermore, an upstream side part of the fuel flow passage 12 is communicated with an annular fuel flow passage 14, which is formed by the cylinder body 19 and a pump housing 29 described below. Furthermore, a fuel input pipe 30 is installed to the pump housing 29 to guide the fuel, which is drawn from the fuel tank, to the fuel flow passage 14. Each of the cylinder body 19 and the pump housing 29 is made of a metal material (e.g., bearing steel, such as JIS-SUJ2) and forms a corresponding part of a housing 70 of the fuel supply pump 1.

One end of the spring 20 is supported by an upper seat 33 to limit expansion of the spring 20 toward the one axial side, and the other end of the spring 20 is supported by a tappet body 32 through a lower seat 31. The spring 20 urges the plunger 3 toward the other axial side such that the other end (hereinafter referred to as a plunger head 34) of the plunger 3 is always engaged with the tappet body 32 through the lower seat 31. At the same time, the spring 20 urges the entire plunger drive mechanism 7 toward the other axial side by urging the tappet body 32 toward the other axial side through the lower seat 31.

The check valve 21 includes a valve element 37 and a spring 38 and is received in the fuel flow passage 13. The valve element 37 is driven to open or close the pressurizing chamber 4 relative to an outlet conduit located at the outside of the fuel supply pump 1. The spring 38 urges the valve element 37 in a valve closing direction relative to the outlet conduit located at the outside of the fuel supply pump 1. Specifically, the check valve 21 limits the backflow of the high pressure fuel of the common rail toward the pressurizing chamber 4 through the output conduit located at the outside of the fuel supply pump 1. When the fuel pressure of the pressurizing chamber 4 exceeds a predetermined valve opening pressure, the check valve 21 is opened to conduct the pressurized fuel, which is pressurized in the pressurizing chamber 4, toward the common rail. A seat 39 is formed in a passage wall (inner peripheral wall) of the fuel flow passage 13 and is adapted to engage with the valve element 37 at the time of closing the fuel flow passage 13. Specifically, the valve element 37 is repeatedly lifted away from and seated (engaged) against the seat 39 at the time of opening and closing, respectively, of the pressurizing chamber 4 relative to the outlet conduit located at the outside of the fuel supply pump 1.

The plunger drive mechanism 7 includes the tappet body 32, a roller 41 and a shoe 42. The tappet body 32 is received in and is supported by a cylindrical support hole 40 such that the tappet body 32 axially reciprocates in the cylindrical support hole 40. The roller 41 is received in the tappet body 32 and contacts an outer peripheral surface of the cam 6. When the cam 6 is rotated, the roller 41 is reciprocated in the axial direction while being rotated by the cam 6. The shoe 42 is fixed in the tappet body 32 and is axially reciprocated together with the tappet body 32. The shoe 42 supports the roller 41 from the radially outer side of the roller 41.

A partitioning portion 43 is formed in a radially inner part of the tappet body 32. The partitioning portion 43 has an axial wall thickness, and the plunger head 34 contacts the partitioning portion 43. A radially inner area of the tappet body 32 is partitioned between one axial end portion and the other axial end portion by the partitioning portion 43. A contact portion of the plunger head 34 and a support seat for supporting the spring 20 through the lower seat 31 are provided in the one end surface of the partitioning portion 43. Furthermore, the roller 41 and the shoe 42 are received on the other end side of the partitioning portion 43. The roller 41 is received such that a rotational axis of the roller 41 is generally perpendicular to the axial direction of the plunger 3.

Furthermore, the support hole 40 is formed in the pump housing 29, to which the high pressure pump 5 is installed. The high pressure pump 5 (more specifically, the cylinder body 19 of the high pressure pump 5) is installed to the pump housing 29 such that the high pressure pump 5 is coaxial with the support hole 40, and thereby the high pressure pump 5 closes the one end of the support hole 40. The other end of the support hole 40 opens to the cam chamber 44, which receives the cam 6. At the other end of the support hole 40, an outer peripheral surface of the roller 41 and an outer peripheral edge of the cam 6 contact with each other such that the roller 41 is rotated by the cam 6. The cam 6 includes a plurality (three in this instance) of lobes (peaks) arranged around a drive shaft 45. The lobes of the cam 6 are arranged at equal angular intervals (e.g., 120 degree intervals in the case of the three lobes) around the drive shaft 45, and the drive shaft 45 is driven by the internal combustion engine.

A rotation limiting portion 46 is formed in the plunger drive mechanism 7 to limit rotation of the plunger drive mechanism 7 about an axis of the plunger drive mechanism 7, which is parallel to the axial direction of the plunger 3. In the rotation limiting portion 46, a positioning member 46a, which circumferentially position the plunger drive mechanism 7, is securely press fitted to an outer peripheral surface of the tappet body 32, and the positioning member 46a is slidably fitted into a slide groove 46b, which is formed in a wall surface of the support hole 40.

The positioning member 46a slides along a surface of the slide groove 46b in response to the reciprocation of the plunger 3 such that the positioning member 46a reciprocates together with the plunger drive mechanism 7. Furthermore, lubricating oil is supplied to the slide groove 46b to lubricate the same.

The lubricating oil is supplied from a lubricating oil suction inlet into a slide clearance between the hole wall (inner peripheral wall) of the support hole 40 and the outer peripheral surface of the tappet body 32, so that the lubricating oil lubricates the connection (contact area) between the hole wall of the support hole 40 and the tappet body 32, the connection (contact area) between the positioning member 46a and the surface of the slide groove 46b, the connection (contact area) between the roller 41 and the shoe 42 and the connection (contact area) between the roller 41 and the cam 6 and is thereafter supplied to and is received in the cam chamber 44. The lubricating oil, which is received in the cam chamber 44, is drawn out of the fuel supply pump 1 through a lubricating oil suction outlet.

The solenoid valve 9 includes a solenoid coil 10, a stator 47, an armature 48, a spring 49, a valve element 50 and the valve body 27. Energization of the solenoid coil 10 is controlled by the ECU. When the solenoid coil 10 is energized, the solenoid coil 10 generates a magnetic flux, which is conducted through the stator 47. Thereafter, the magnetic flux is passed to the armature 48. The armature 48 is magnetically attracted to the stator 47 toward the one axial side. The spring 49 urges the armature 48 toward the other axial side. The valve element 50 is axially moved together with the armature 48, so that the valve element 50 opens or closes the connection between the upstream side fuel flow passages 16, 17 and the pressurizing chamber 4. The valve body 27 axially slidably supports a shaft 51 of the valve element 50 and forms the valve chamber 24, which receives a valve portion 26 of the valve element 50.

A slide hole 52, which slidably receives the shaft 51, is formed in the valve body 27 such that the slide hole 52 axially extends through the valve body 27. The valve chamber 24 is formed at the other end of the slide hole 52.

The armature 48 is fixed to the one axial end portion of the shaft 51, which projects from the slide hole 52. The other axial end portion of the shaft 51 has a reduced diameter part that is configured such that the reduced diameter part has a reduced outer diameter, which is smaller than that of an axial center portion of the shaft 51 axially located between the one end portion and the other end portion of the shaft 51. Thereby, the annular fuel flow passage 16 is formed between the shaft 51 and the wall surface of the slide hole 52. A fuel flow passage 17 is formed in the valve body 27 such that the fuel flow passage 17 communicates between the fuel flow passage 11 and the fuel flow passage 16.

A seat surface 53 is formed in a tapered wall surface of the valve body 27 at one end side part of the valve chamber 24. The valve portion 26 of the valve element 50 seats against the seat surface 53 when the armature 48 and the valve element 50 are moved toward the one axial side upon the energization of the solenoid coil 10. When the valve portion 26 of the valve element 50 seats against the seat surface 53, the connection between the valve chamber 24 and the fuel flow passage 16 is closed. Furthermore, when the armature 48 and the valve element 50 are urged toward the other axial side by the spring 49 upon deenergization of the solenoid coil 10, the valve portion 26 is lifted away from the seat surface 53. Thereby, the connection between the valve chamber 24 and the fuel flow passage 16 is opened. At this time, the valve portion 26 of the valve element 50 contacts the flow passage forming member 23, so that the movement of the valve element 50 toward the other axial side is limited.

With the above described construction, in the fuel supply pump 1, the solenoid valve 9 is operated to close the valve element 50 when the plunger 3 is moved toward the one axial side to compress the pressurizing chamber 4. In this way, the fuel supply pump 1 serves as a discharge quantity metering pump, which meters a discharge quantity of fuel discharged from the pressurizing chamber 4.

Specifically, at the time of moving the plunger 3 toward the one axial side to compress the pressurizing chamber 4, when the solenoid coil 10 is energized in response to the corresponding command from the ECU, the valve portion 26 of the valve element 50 is seated against the seat surface 53 to close the connection between the valve chamber 24 and the fuel flow passage 16 and the connection between the pressurizing chamber 4 and the upstream side fuel flow passages 16, 17. In this way, the fuel pressure of the pressurizing chamber 4 is increased and becomes larger than the valve opening pressure of the check valve 21. Thus, the check valve 21 is opened, and thereby the fuel supply from the fuel supply pump 1 to the common rail is started.

When the energization of the solenoid coil 10 is stopped in response to the corresponding command from the ECU, the valve portion 26 of the valve element 50 is lifted away from the seat surface 53 to open the connection between the valve chamber 24 and the fuel flow passage 16 and the connection between the pressurizing chamber 4 and the upstream side fuel flow passages 16, 17. In this way, the fuel pressure of the pressurizing chamber 4 is decreased and becomes smaller than the valve opening pressure of the check valve 21. Thus, the check valve 21 is closed, and thereby the fuel supply from the fuel supply pump 1 to the common rail is terminated.

Figure 2A:
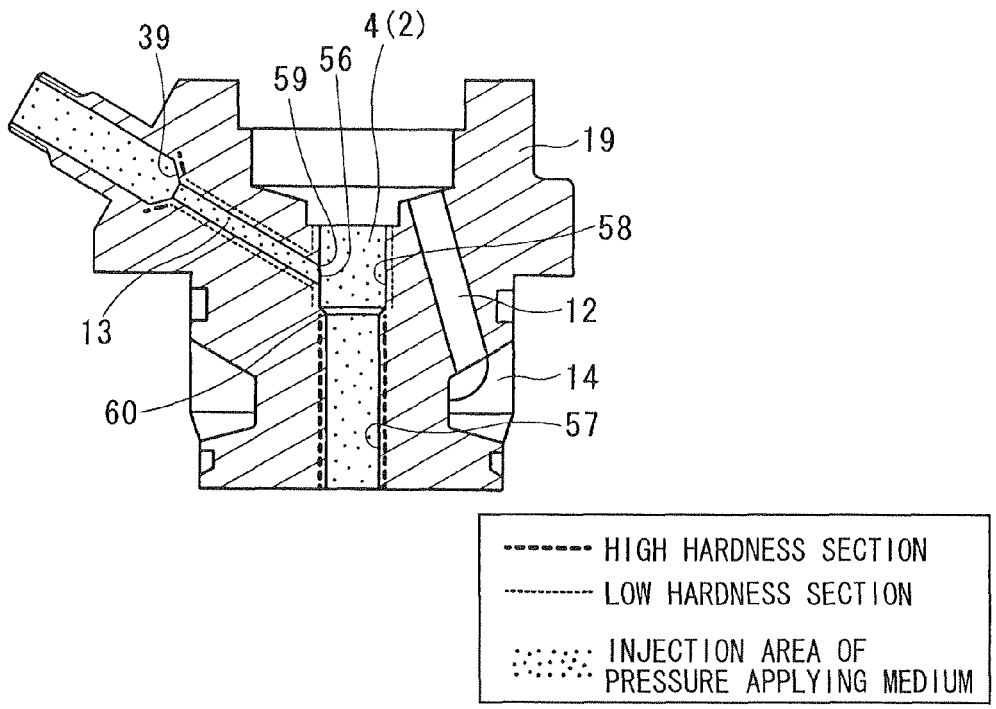
FIG. 2A is a schematic view showing a high hardness section, a low hardness section and a pressure applying area (an injection area of pressure applying medium) of an autofrettage process in the fuel supply pump according to the first embodiment.
Figure 2B:
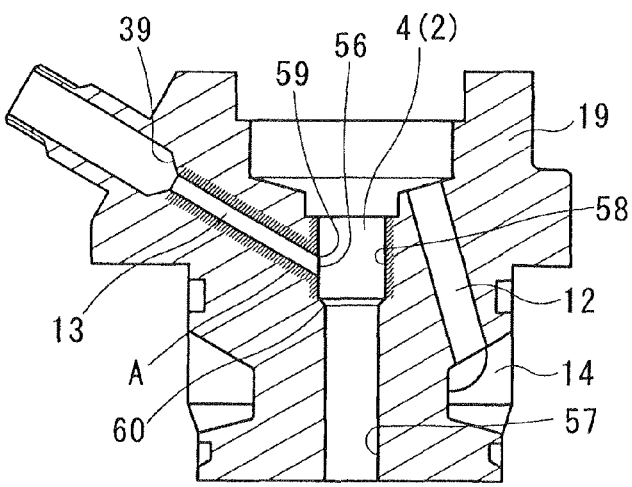
FIG. 2B is a schematic view showing a prestressing subject area (forming a prestressed area after the autofrettage process) of the fuel supply pump, to which a residual compression stress is applied to form the prestressed area, according to the first embodiment.

Characteristic features of the fuel supply pump 1 of the first embodiment will be described with reference to FIGS. 1 to 2B.

The fuel flow passage 13, which serves as the discharge flow passage, is connected to the pressurizing chamber 4. A connection opening 56 of the fuel flow passage 13 is formed in the hole wall of the cylinder hole 2, which forms the pressurizing chamber 4. The hole wall of the cylinder hole 2 has a slidable wall portion 57 and a non-slidable wall portion 58. In other words, the hole wall of the cylinder hole 2 is divided into the slidable wall portion 57 and the non-slidable wall portion 58. The non-slidable wall portion 58 has an inner diameter larger than that of the slidable wall portion 57, so that an inner peripheral wall surface of the non-slidable wall portion 58 is radially outwardly displaced from an inner peripheral wall surface of the slidable wall portion 57. The plunger 3 is adapted to slide on the slidable wall portion 57 and does not slide on the non-slidable wall portion 58. The fuel flow passage 13 is connected to the non-slidable wall portion 58, and the pressurizing chamber 4 is formed mainly by the non-slidable wall portion 58.

The hole wall of the cylinder hole 2 and the passage wall of the fuel flow passage 13 are pressurized through autofrettage to apply a residual compression stress in a predetermined prestressing subject area to form a prestressed area (a prestressed range) A of the final product, which includes an inner peripheral edge 59 of the connection opening 56 and an adjacent area around the inner peripheral edge 59. Here, it should be understood that the prestressing subject area refers to an area, which later becomes the prestressed area A after the application of the residual compression stress thereto. In this embodiment, the prestressed area A, in which the residual compression stress is applied, includes the non-slidable wall portion 58 and the passage wall of the upstream part of the fuel flow passage 13, which is located on the upstream side of the seat 39.

The autofrettage is a process of injecting high pressure fluid (pressure applying medium), which has a pressure higher than a fuel pressure applied during an operation time (service time) of the fuel supply pump 1, into a fuel flowing portion, such as the pressurizing chamber 4, to apply the pressure to a wall surface, which forms the fuel flowing portion, and thereby to apply the residual compression stress to the wall surface.

In the fuel supply pump 1 of the first embodiment, the pressure applying medium is injected throughout the cylinder hole 2 and the fuel flow passage 13. Therefore, a pressure applying area, in which the pressure is applied by the pressure applying medium through the autofrettage, includes the non-slidable wall portion 58 and extends to the slidable wall portion 57 beyond a boundary 60 between the slidable wall portion 57 and the non-slidable wall portion 58. In the fuel supply pump 1 of the first embodiment, the residual compression stress is applied only to the prestressing subject area, which later becomes the prestressed area A in the final product, in the pressure applying area by applying the pressure through autofrettage upon execution of the following procedure.

Specifically, in the hole wall of the cylinder hole 2 and the passage wall of the fuel flow passage 13, the slidable wall portion 57 needs to have an increased hardness to ensure a sufficient seizing resistance against the slide contact of the plunger 3, and the seat 39 needs to have an increased hardness to ensure a sufficient wearing resistance against the repeated lifting and seating of the valve element 37. Therefore, before the application of the pressure through the autofrettage, a carburizing process is performed on the entire hole wall of the cylinder hole 2, which includes the slidable wall portion 57, and the entire passage wall of the fuel flow passage 13, which includes the seat 39. This carburizing process is performed after executing an anti-carburizing process, such as application of masking, on the prestressing subject area, to which the pressure is applied by pressure applying medium to generate the residual compression stress to form the prestressed area A through the autofrettage after the execution of the anti-carburizing process.

Therefore, the hardness of the prestressing subject area, which corresponds to and later becomes the prestressed area A, is not increased even after the carburizing process, since the prestressing subject area is protected from the carburization by, for example, the masking. Thus, in the state, which is after the carburizing process but before the application of the pressure through the autofrettage, a difference between the hardness of the prestressing subject area, which corresponds to the prestressed area A, and a hardness of the slidable wall portion 57 and the seat 39 is equal to or higher than Vickers Pyramid Number (HV) 100.

Therefore, although the pressure is applied to the entire hole wall of the cylinder hole 2 and the entire passage wall of the fuel flow passage 13 through the autofrettage, the residual compression stress is applied only to the prestressing subject area, i.e., the prestressed area A.

Now, advantages of the first embodiment will be described.

In the fuel supply pump 1 of the first embodiment, the pressure is applied to apply the residual compression stress at least to the prestressed area A, which needs to have the increased pressure resistance and includes the inner peripheral edge 59 of the connection opening 56 and the adjacent area around the inner peripheral edge 59, in the hole wall of the cylinder hole 2 and the passage wall of the fuel flow passage 13 through the autofrettage.

Therefore, in the fuel supply pump 1, the seizing resistance is implemented against the slide contact of the plunger 3 relative to the hole wall of the cylinder hole 2, and the pressure resistance is increased at the inner peripheral edge 59 of the connection opening 56 and the adjacent area around the inner peripheral edge 59.

Furthermore, in the state before the application of the pressure through the autofrettage, the difference between the hardness of the inner peripheral edge 59 of the connection opening 56 and the adjacent area around the inner peripheral edge 59 and the hardness of the slidable wall portion 57 and the seat 39 is equal to or lager than HV 100.

Therefore, it is possible to achieve both of the application of the residual compression stress to the inner peripheral edge 59 of the connection opening 56 and the adjacent area around the inner peripheral edge 59 and the implementation of the seizing resistance at the slidable wall portion 57.

Furthermore, the inner peripheral edge 59 of the connection opening 56 and the adjacent area around the inner peripheral edge 59 undergo the carburizing process after the anti-carburizing process thereof, so that the carburization of the inner peripheral edge 59 of the connection opening 56 and the adjacent area around the inner peripheral edge 59 can be limited.

Thereby, the pressure can be applied through the autofrettage upon the increasing of the hardness of the slidable wall portion 57 and the seat 39, which are other than the inner peripheral edge 59 of the connection opening 56 and the adjacent area around the inner peripheral edge 59, without increasing the hardness of the inner peripheral edge 59 of the connection opening 56 and the adjacent area around the inner peripheral edge 59. Therefore, when the pressure is applied to the entire hole wall of the cylinder hole 2 through the autofrettage, the residual compression stress can be applied only to the predetermined prestressing subject area, which includes the inner peripheral edge 59 of the connection opening 56 and the adjacent area around the inner peripheral edge 59. Thus, it is not required to set the pressure applying area in the hole wall of the cylinder hole 2 during the autofrettage, and thereby it is possible to alleviate the cumbersome procedure involved in the autofrettage.

(Second Embodiment)

Figure 3A:
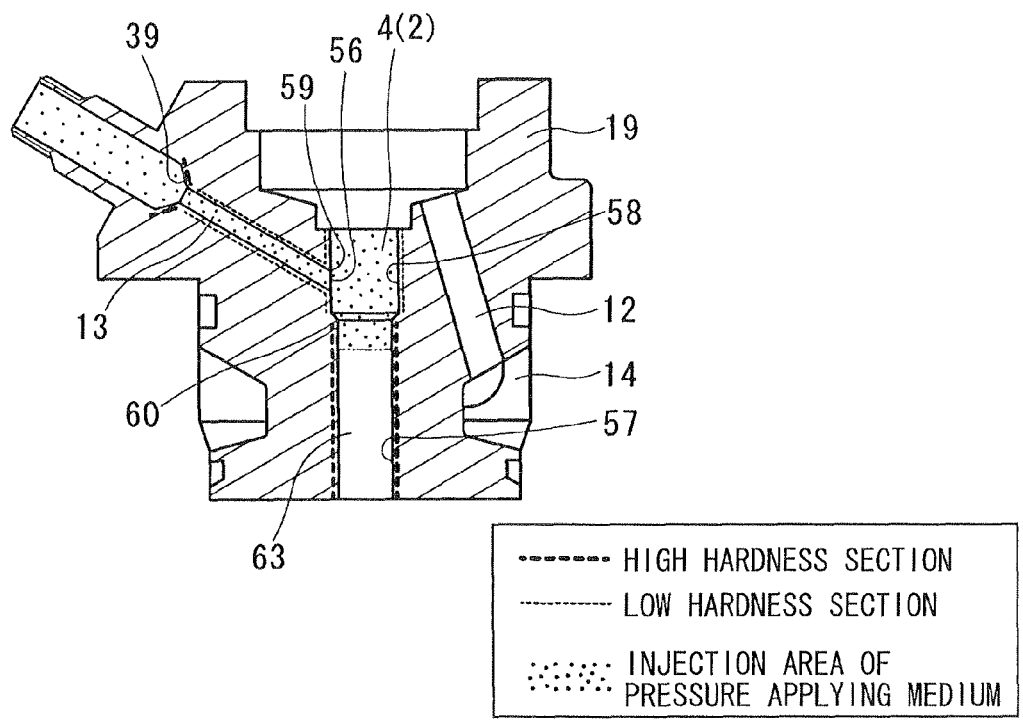
FIG. 3A is a schematic view showing a high hardness section, a low hardness section and a pressure applying area of an autofrettage process in a fuel supply pump according to a second embodiment of the present invention.

According to a second embodiment of the present invention, as shown in FIG. 3A, a blocking member 63 is installed in the cylinder hole 2 to define an injection area (an injection range) of the high pressure liquid. Due to the presence of the blocking member 63, the pressure applying area, to which the pressure is applied through the autofrettage, extends to the portion of the slidable wall portion 57 beyond the boundary 60 without extending throughout the entire slidable wall portion 57.

Figure 3B:
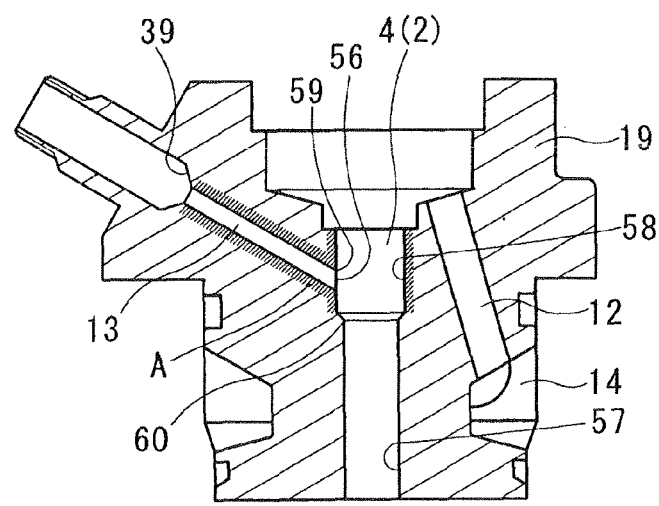
FIG. 3B is a schematic view showing a prestressing subject area of the fuel supply pump, to which a residual compression stress is applied to form a prestressed area, according to the second embodiment.

Thereby, the pressure can be applied through the autofrettage in the minimum area that includes the prestressed area A of FIG. 3B, in which the residual compression stress needs to be applied, without a need for precisely setting the position of the blocking member 63. Therefore, in the case where the pressure applying area in the autofrettage needs to be limited to the portion of the hole wall of the cylinder hole 2 rather than to the entire hole wall of the cylinder hole 2, the required position setting accuracy of the blocking member 63 can be lowered to alleviate the cumbersome procedure involved in the autofrettage.

Furthermore, since the pressure is not applied to the entire hole wall of the cylinder hole 2 through the autofrettage, it is possible to substantially reduce the pressure applying area in the unnecessary area of the hole wall of the cylinder hole 2, in which the residual compression stress is not required. Therefore, the energy costs, which are involved in the autofrettage, can be reduced.

The prestressing subject area, which corresponds to the prestressed area A, undergoes the carburizing process after the execution of the anti-carburizing process thereto, so that the carburization of the prestressing subject area, which corresponds to the prestressed area A, can be limited. Then, the pressure is applied to this prestressing subject area, which corresponds to the prestressed area A, after the carburizing process, like in the first embodiment.

(Third Embodiment)

Figure 4A:
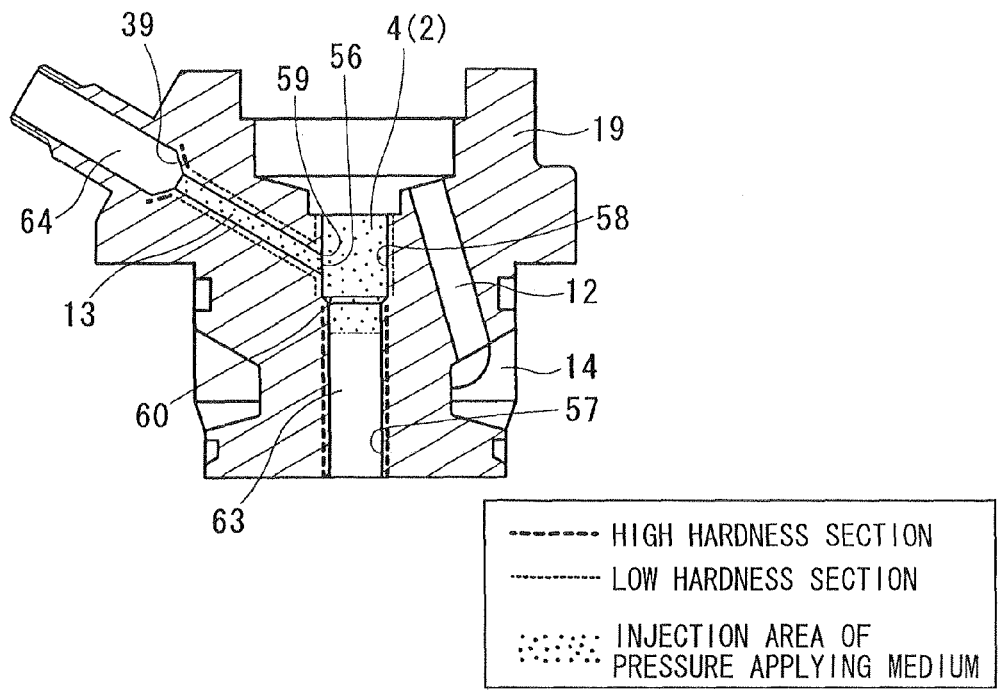
FIG. 4A is a schematic view showing a high hardness section, a low hardness section and a pressure applying area of an autofrettage process in a fuel supply pump according to a third embodiment of the present invention.
Figure 4B:
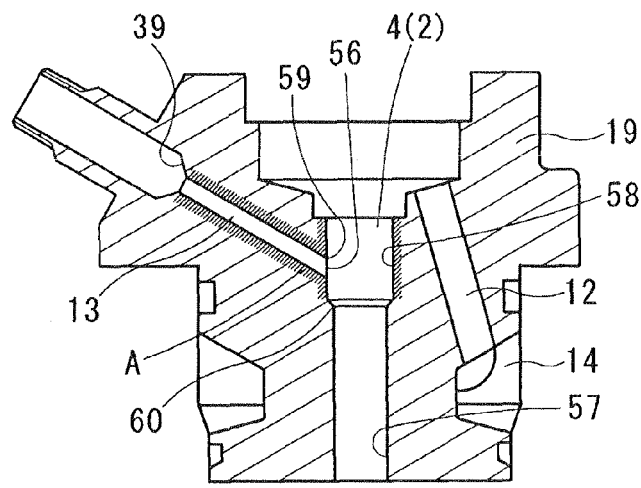
FIG. 4B is a schematic view showing a prestressing subject area of the fuel supply pump, to which a residual compression stress is applied to form a prestressed area, according to the third embodiment.
Figure 5:
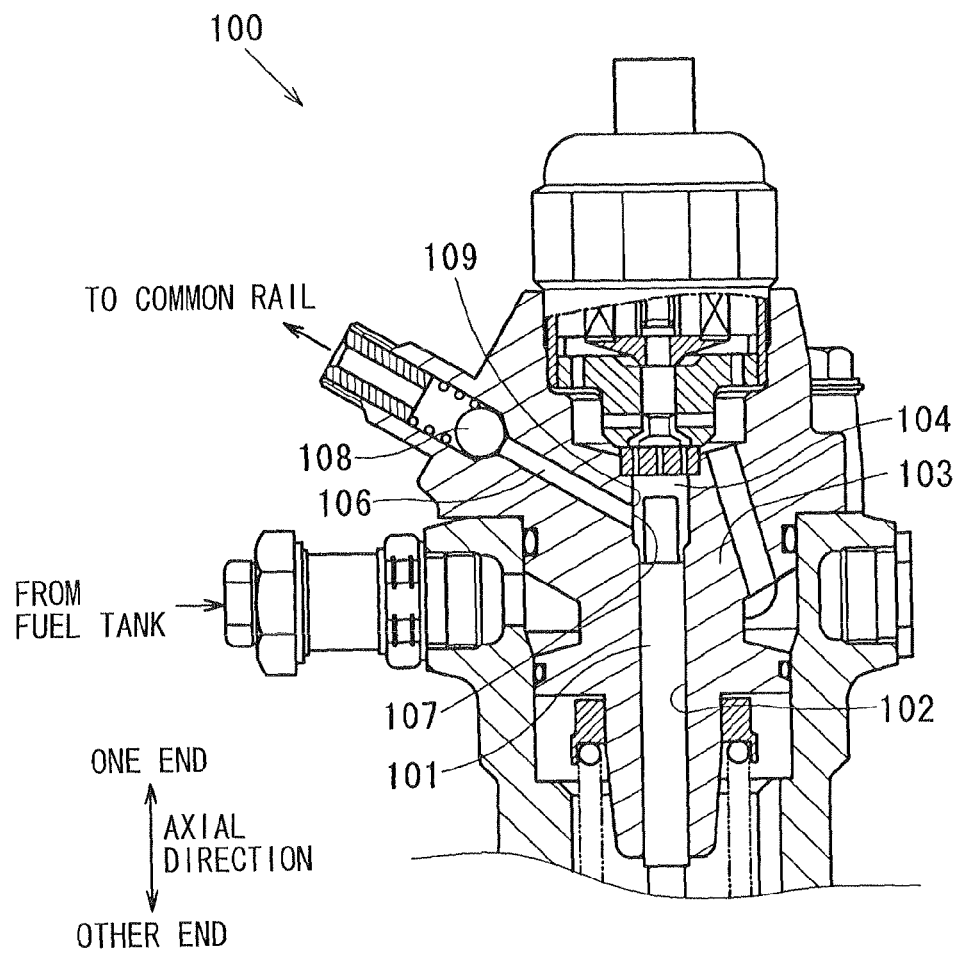
FIG. 5 is a partial schematic cross sectional view showing a prior art fuel supply pump.

According to a third embodiment of the present invention, as shown in FIG. 4A, a blocking member 64 is inserted into the fuel flow passage 13 to define an injection area (an injection range) of the high pressure fluid in the fuel flow passage 13. The blocking member 64 is inserted into the fuel flow passage 13 such that the pressure applying area, to which the pressure is applied through the autofrettage, does not extend from the pressurizing chamber 4 to the seat 39 in the passage wall of the fuel flow passage 13.

The hardness of the seat 39, against which the valve element 37 of the check valve 21 is seated, is increased to implement the wearing resistance against the repeated seating and lifting of the valve element 37 of the check valve 21 relative to the seat 39. Furthermore, the application of the pressure to the seat 39 through the autofrettage is not required and is difficult.

In view of the above points, the pressure applying area in the autofrettage is limited by the blocking member 64 such that the pressure applying area does not extend to the seat 39 in the passage wall of the fuel flow passage 13. In this way, the pressure is not applied through the autofrettage to the unnecessary area of the passage wall of the fuel flow passage 13, in which the application of the residual compression stress is not required. Therefore, the energy costs, which are involved in the autofrettage, can be reduced.

The fuel supply pump of the present invention is not limited to the first to third embodiments, and the above embodiments may be modified within a spirit and scope of the present invention.

For example, in the fuel supply pump 1 of the first to third embodiments, the hardness of the slidable wall portion 57 and the seat 39 is increased through the carburizing process. Alternatively, the hardness of the slidable wall portion 57 and the seat 39 may be increased through a nitriding process, an induction hardening process (an induction quenching process) or a laser hardening process (a laser quenching process).

In the fuel supply pump 1 of the first to third embodiments, at the time before the application of the pressure through the autofrettage, in order to implement the low hardness of the prestressing subject area, which corresponds to, i.e., which later becomes the prestressed area A in the final product, the prestressing subject area, which corresponds to the prestressed area A, undergoes the carburizing process after the execution of the anti-carburizing process thereto. However, the way of implementing the low hardness of the prestressing subject area, which corresponds to the prestressed area A, is not limited to this. For example, the hole wall of the cylinder hole 2 and the passage wall of the fuel flow passage 13, which include the prestressed area A, may be processed through the carburizing process, the nitriding process, the induction hardening process (induction quenching process) or the laser hardening process (laser quenching process), and thereafter a surface portion of the prestressing subject area, which corresponds to the prestressed area A, may be removed to have the low hardness of the prestressing subject area.

Furthermore, in the case where the hardness is increased by the hardening process (quenching process), the hardness of the prestressing subject area, which corresponds to the prestressed area A, may be reduced by a tempering process, which is performed after the hardening process (quenching process).

Furthermore, in the fuel supply pump 1 of the first to third embodiments, the pressure applying area in the autofrettage extends into the slidable wall portion 57 beyond the boundary 60 between the slidable wall portion 57 and the non-slidable wall portion 58. Alternatively, the pressure applying area in the autofrettage may be limited only to the non-slidable wall portion 58 in the hole wall of the cylinder hole 2.

In such a case, the pressure is not applied to the unnecessary area, in which the application of the residual compression stress is not required, in the hole wall of the cylinder hole 2. Thus, the energy costs, which are involved in the autofrettage, can be reduced.

Furthermore, in the fuel supply pump 1 of the first to third embodiments, the check valve 21 is placed in the fuel flow passage 13, which is provided in the cylinder body 19. Alternatively, a member, which receives the check valve 21, may be provided as a separate member, which is separately formed from the cylinder body 19. Then, the member, which receives the check valve 21, may be fixed to the cylinder body 19 through, for example, tightening of a thread formed in the member, which receives the check valve 21, against a thread formed in the cylinder body 19.

Also, in the fuel supply pump 1 of the first to third embodiments, the cam 6 has the three lobes (peaks), which are arranged at 120 degree intervals in the circumferential direction. Alternatively, the cam 6 may be configured to have two lobes (peaks), which are arranged at 180 degree intervals.

Furthermore, in the first to third embodiments, the fuel supply pump 1 is the discharge quantity metering pump. Alternatively, the fuel supply pump 1 may be changed to, for example, an intake quantity metering pump by installing an intake quantity metering valve of a solenoid type, which meters an intake quantity of fuel supplied to the pressurizing chamber 4, to the fuel supply pump 1 in place of the solenoid valve 9.

Additional advantages and modifications will readily occur to those skilled in the art. The invention in its broader terms is therefore not limited to the specific details, representative apparatus, and illustrative examples shown and described.

What is claimed is:

1. A fuel supply pump comprising:
a plunger that is adapted to reciprocate in an axial direction thereof; and
a housing that includes a cylinder hole, in which the plunger is axially slidably received, wherein:
one axial end portion of the cylinder hole is fluid-tightly closed by the plunger to form a pressurizing chamber therein;
the plunger is adapted to reciprocate and slide in the axial direction in the cylinder hole to change a volume of the pressurizing chamber and thereby to draw fuel into the pressurizing chamber and then discharge the fuel from the pressurizing chamber upon pressurization of the fuel in the pressurizing chamber;
a discharge flow passage is connected to the pressurizing chamber at the housing and is adapted to guide and discharge the pressurized fuel from the pressurizing chamber to an outside of the fuel supply pump;
a connection opening of the discharge flow passage opens to the pressurizing chamber and is formed in a hole wall of the cylinder hole, which forms the pressurizing chamber;
a prestressed area is formed in the hole wall of the cylinder hole and a passage wall of the discharge flow passage such that the prestressed area includes an inner peripheral edge of the connection opening and has a residual compression stress generated by a pressure that is applied through autofrettage;
a check valve is placed in the discharge flow passage to limit a backflow of the fuel into the pressurizing chamber;
the check valve opens to conduct the pressurized fuel from the pressurizing chamber to the outside of the fuel supply pump through the discharge flow passage when a fuel pressure of the pressurized fuel in the pressurizing chamber becomes larger than predetermined valve opening pressure;
a seat, relative to which a valve element of the check valve is adapted to be seated and lifted, is formed in the passage wall of the discharge flow passage; and
a pressure applying area, to which the pressure is applied through the autofrettage to form the prestressed area, does not reach to the seat in the passage wall of the discharge flow passage.

2. The fuel supply pump according to claim 1, wherein:
the hole wall of the cylinder hole is divided into a slidable wall portion, on which the plunger is adapted to slide, and a non-slidable wall portion, on which the plunger does not slide;
the connection opening is connected to the non-slidable wall portion; and the pressure applying area, to which the pressure is applied through the autofrettage to form the prestressed area, extends from the non-slidable wall portion into a portion of the slidable wall portion beyond a boundary between the non-slidable wall portion and the slidable wall portion.

3. The fuel supply pump according to claim 1, wherein:
the connection opening is connected to a non-slidable wall portion, on which the plunger does not slide, in the hole wall of the cylinder hole; and
the pressure applying area of the hole wall of the cylinder hole, to which the pressure is applied through the autofrettage to form the prestressed area, is limited within the non-slidable wall portion in the hole wall of the cylinder hole.

4. The fuel supply pump according to claim 1, wherein:
the hole wall of the cylinder hole is divided into a slidable wall portion, on which the plunger is adapted to slide, and a non-slidable wall portion, on which the plunger does not slide;
the connection opening is connected to the non-slidable wall portion; and
the slidable wall portion has a hardness, which is higher than a hardness of the inner peripheral edge of the connection opening at time immediately before application of the pressure through the autofrettage.

5. The fuel supply pump according to claim 4, wherein a difference between the hardness of the slidable wall portion and the hardness of the inner peripheral edge of the connection opening is equal to or higher than HV 100 at the time immediately before application of the pressure through the autofrettage.

6. The fuel supply pump according to claim 4, wherein the hardness of the slidable wall portion is increased relative to the hardness of the inner peripheral edge of the connection opening by one of a carburizing process, a nitriding process, an induction hardening process and a laser hardening process.

7. The fuel supply pump according to claim 6, wherein the inner peripheral edge of the connection opening is processed through the carburizing process after performing an anti-carburizing process on the inner peripheral edge of the connection opening.

8. The fuel supply pump according to claim 6, wherein a surface portion of the inner peripheral edge of the connection opening is removed after performing the one of the carburizing process, the nitriding process, the induction hardening process and the laser hardening process.

9. A manufacturing method for a housing of a fuel supply pump, comprising:
forming the housing from a metal material such that the housing includes:
a cylinder hole, which is adapted to receive a plunger in an axially slidable manner and forms a pressurizing chamber in one axial end portion of the cylinder hole to pressurize fuel therein upon slide movement of the plunger in the cylinder hole; and
a discharge flow passage, which is connected to the pressurizing chamber and is adapted to guide and discharge the pressurized fuel from the pressurizing chamber to an outside of the housing, wherein a connection opening of the discharge flow passage opens to the pressurizing chamber and is formed in a hole wall of the cylinder hole, which forms the pressurizing chamber; and
applying a pressure to a predetermined prestressing subject area in the hole wall of the cylinder hole and a passage wall of the discharge flow passage through autofrettage to generate a residual compression stress in the predetermined prestressing subject area and thereby to form a prestressed area, wherein the predetermined prestressing subject area includes an inner peripheral edge of the connection opening, wherein:
the forming of the housing includes forming a seat in the passage wall of the discharge flow passage such that the seat is configured to be engageable with a valve element of a check valve, which is adapted to be received in the discharge flow passage; and
the applying of the pressure includes applying the pressure through the autofrettage in a pressure applying area which includes the predetermind prestressing subject area, such that the pressure applying area does not reach to the seat in the passage wall of the discharge flow passage.

10. The manufacturing method according to claim 9, wherein:
the forming of the housing includes forming the cylinder hole such that the hole wall of the cylinder hole is divided into a slidable wall portion, on which the plunger is adapted to slide, and a non-slidable wall portion, on which the plunger does not slide, and the connection opening is connected to the non-slidable wall portion; and
the pressure applying area includes the predetermined prestressing subject area and extends from the non-slidable wall portion into a portion of the slidable wall portion beyond a boundary between the non-slidable wall portion and the slidable wall portion.

11. The manufacturing method according to claim 9, wherein;
the forming of the housing includes forming the cylinder hole such that the hole wall of the cylinder hole is divided into a slidable wall portion, on which the plunger is adapted to slide, and a non-slidable wall portion, on which the plunger does not slide, and the connection opening is connected to the non-slidable wall portion; and
the pressure applying area of the hole wall of the cylinder hole includes the predetermined prestressing subject area and is limited within the non-slidable wall portion in the hole wall of the cylinder hole.

12. The manufacturing method according to claim 9, wherein;
the forming of the housing includes forming the cylinder hole such that the hole wall of the cylinder hole is divided into a slidable wall portion, on which the plunger is adapted to slide, and a non-slidable wall portion, on which the plunger does not slide, and the connection opening is connected to the non-slidable wall portion; and
the manufacturing method further comprises increasing a hardness of the slidable wall portion such that the hardness of the slidable wall portion is higher than a hardness of the inner peripheral edge of the connection opening before the applying of the pressure through the autofrettage.

13. The manufacturing method according to claim 12, wherein the increasing of the hardness of the slidable wall portion is executed such that a difference between the hardness of the slidable wall portion and the hardness of the inner peripheral edge of the connection opening is equal to or higher than HV 100 at the time immediately before the applying of the pressure through the autofrettage.

14. The manufacturing method according to claim 12, wherein the increasing of the hardness of the slidable wall portion includes executing one of a carburizing process, a nitriding process, an induction hardening process and a laser hardening process on the slidable wall portion.

15. The manufacturing method according to claim 14, wherein:
- the increasing of the hardness of the slidable wall portion includes executing the carburizing process on the slidable wall portion; and
- the manufacturing method further comprises executing an anti-carburizing process on the inner peripheral edge of the connection opening before the executing of the carburizing process.

16. The manufacturing method according to claim 14, further comprising removing a surface portion of the inner peripheral edge of the connection opening after the executing of the one of the carburizing process, the nitriding process, the induction hardening process and the laser hardening process on the slidable wall portion.

\* \* \* \* \*